United States Patent [19]

Okane et al.

[11] Patent Number: 4,802,456
[45] Date of Patent: Feb. 7, 1989

[54] DEVICE FOR CONTROLLING CHARGING PRESSURE OF A SUPERCHARGED INTERNAL COMBUSTION ENGINE

[75] Inventors: Yukihiro Okane; Koji Endo; Masayoshi Nakai, all of Toyota, Japan

[73] Assignee: Toyota Jidosha Kabushiki Kaisha, Aichi, Japan

[21] Appl. No.: 73,284

[22] Filed: Jul. 14, 1987

[30] Foreign Application Priority Data

Aug. 15, 1986 [JP] Japan ................................ 61-190559

[51] Int. Cl.$^4$ ...................... F02B 33/38; F02D 23/00
[52] U.S. Cl. .................................................. 123/564
[58] Field of Search ........................... 123/564; 60/611

[56] References Cited

U.S. PATENT DOCUMENTS 4,611,568 9/1986 Onaka et al. .................... 123/504 X
4,656,992 4/1987 Onaka et al. .................... 123/564 X

FOREIGN PATENT DOCUMENTS 39927 3/1984 Japan ................................ 123/564
17138 1/1986 Japan ................................ 123/564
17141 1/1986 Japan ................................ 123/564

*Primary Examiner*—Michael Koczo
*Attorney, Agent, or Firm*—Parkhurst, Oliff & Berridge

[57] ABSTRACT

An engine comprising a mechanically driven charger arranged in the intake passage downstream of the throttle valve. A bypass passage is branched from the intake passage between the throttle valve and the mechanically driven charger and connected to the intake passage downstream of the mechanically driven charger. A relief valve is arranged in the bypass passage to control the maximum charging pressure produced in the intake passage downstream of the mechanically driven charger. The relief valve is controlled so that the maximum charging pressure is increased when the engine is operating at a low or middle speed, and the maximum charging pressure is reduced when the engine is operating at a high speed.

8 Claims, 5 Drawing Sheets

DEVICE FOR CONTROLLING CHARGING PRESSURE OF A SUPERCHARGED INTERNAL COMBUSTION ENGINE

BACKGROUND OF THE INVENTION

1. Field of the Invention

The present invention relates to a device for controlling a charging pressure of an internal combustion engine.

2. Description of the Related Art

In an internal combustion engine equipped with a mechanically driven charger used for increasing the pressure of air fed into the cylinders, that is, increasing the charging pressure, the charging pressure is increased as the engine speed is increased, and thus the amount of air fed into the engine cylinders becomes maximum when the engine is operating under a heavy load at a high speed. Consequently, when the engine is operating under a heavy load at a high speed, the thermal load of the engine becomes maximum, and thus, if the charging pressure is excessively increased at this time, the durability of the engine is decreased. Therefore, in an engine equipped with a mechanically driven charger, it is necessary to control the charging pressure to a pressure lower than a charging pressure which will have an adverse affect on the engine when the engine is operating under a heavy load at a high speed, wherein the engine load becomes maximum. To this end, an engine is known in which a throttle valve is arranged in the intake passage of the engine, and a mechanically driven charger driven by the engine is arranged in the intake passage downstream of the throttle valve. A bypass passage is branched from the intake passage between the throttle valve and the mechanically driven charger and connected to the intake passage downstream of the mechanically driven charger. A relief valve having a pressure control chamber therein is arranged in the bypass passage, and the pressure control chamber of the relief valve is connected to the intake passage between the throttle valve and the mechanically driven charger, so that the relief pressure of the relief valve is decreased as the level of vacuum acting on the pressure control chamber is increased (see Japanese Unexamined Utility Model Publication No. 61-17138). In this engine, when the discharge pressure of the mechanically driven charger, i.e., the charging pressure, exceeds the relief pressure of the relief valve, a part of air pressurized by the mechanically driven charger is returned to the intake passage upstream of the mechanically driven charger via the bypass passage, and as a result, the charging pressure is maintained at a predetermined relief pressure. As mentioned above, in this engine, since the charging pressure is controlled to a pressure that does not exceed the predetermined relief pressure, it is possible to prevent a decrease of durability of the engine.

Another engine is known in which a throttle valve is arranged in the intake passage of the engine, and a mechanically driven charger driven by the engine is arranged in the intake passage downstream of the throttle valve. A bypass passage is branched from the intake passage between the throttle valve and the mechanically driven charger and connected to the intake passage downstream of the mechanically driven charger, and a control valve having a pressure control chamber therein is arranged in the bypass passage. When the temperature of the engine is low, the pressure control chamber of the control valve is open to the outside air so that the control valve is kept shut. After the warm-up of the engine is completed, the pressure control chamber of the control valve is connected to the intake passage between the throttle valve and the mechanically driven charger. At this time, when the level of vacuum in the intake passage between the throttle valve and the mechanically driven charger is reduced, that is, when the engine is operating under a heavy load, the control valve is closed (see Japanese Unexamined Utility Model Publication No. 61-17141). In this engine, when the temperature of the engine is low, the charging pressure is maintained at a maximum charging pressure which can be obtained by the mechanically driven charger by keeping the control valve shut irrespective of the engine load, thus obtaining an easy engine start up.

As mentioned above, the thermal load of the engine becomes maximum when the engine is operating under a heavy load at a high speed, and thus the durability of the engine depends on the change in pressure produced when the engine is operating under a heavy load at a high speed. Conversely, when the engine is operating at a middle or low speed, the thermal load of the engine is low. Consequently, at this time, even if the charging pressure is increased, there is no danger of a decrease in the durability of the engine. On the contrary, by increasing the charging pressure, it is possible to obtain a good accelerating operation.

However, if the pressure control chamber of the relief valve is connected to the intake passage between the throttle valve and the mechanically driven charger, and if the relief pressure is controlled to a low pressure when the engine is operating under a heavy load at a high speed, as in an engine disclosed in the above-mentioned Japanese Utility Model Publication No. 61-17138, the relief pressure is inevitably controlled to a low pressure when the engine is operating at a middle speed. As a result, since the charging pressure is controlled to a low pressure when the engine is operating at a middle speed, it is difficult to obtain a good accelerating operation.

In an engine disclosed in the above-mentioned Japanese Utility Model Publication No. 61-17141, the charging pressure is not controlled to a low pressure when the engine is operating under a heavy load at a high speed. Consequently, in this engine, the problem to be solved by the present invention does not essentially arise.

SUMMARY OF THE INVENTION

An object of the present invention is to provide a charging pressure control device capable of obtaining a good accelerating operation and a good durability of the engine.

According to the present invention, there is provided a device for controlling a charging pressure of an internal combustion engine having an intake passage, this device comprising: a throttle valve arranged in the intake passage; a mechanically driven charger driven by the engine and arranged in the intake passage downstream of the throttle valve; a bypass passage branched from the intake passage between the throttle valve and the mechanically driven charger and connected to the intake passage downstream of the mechanically driven charger; a relief valve arranged in the bypass passage and having a pressure control chamber, this relief valve controlling a maximum charging pressure in the intake passage downstream of the mechanically driven charger by controlling a flow area of the bypass passage in response to an absolute pressure in the pressure control chamber, to reduce the maximum charging pressure as the absolute pressure is reduced; a pressure source having a pressure which is not less than the atmospheric pressure; a speed detector for producing an output signal indicating an engine speed; and a control unit selectively connecting the pressure control chamber to the pressure source or the intake passage between the throttle valve and the mechanically driven charger in response to a signal output by the speed detector, to connect the pressure control chamber to the pressure source when the engine speed is lower than a predetermined speed and to connect the pressure control chamber to the intake passage between the throttle valve and the mechanically driven charger when the engine speed is higher than a predetermined speed.

The present invention may be more fully understood from the description of preferred embodiments of the invention set forth below, together with the accompanying drawings.

DESCRIPTION OF THE PREFERRED EMBODIMENTS

Figure 1:
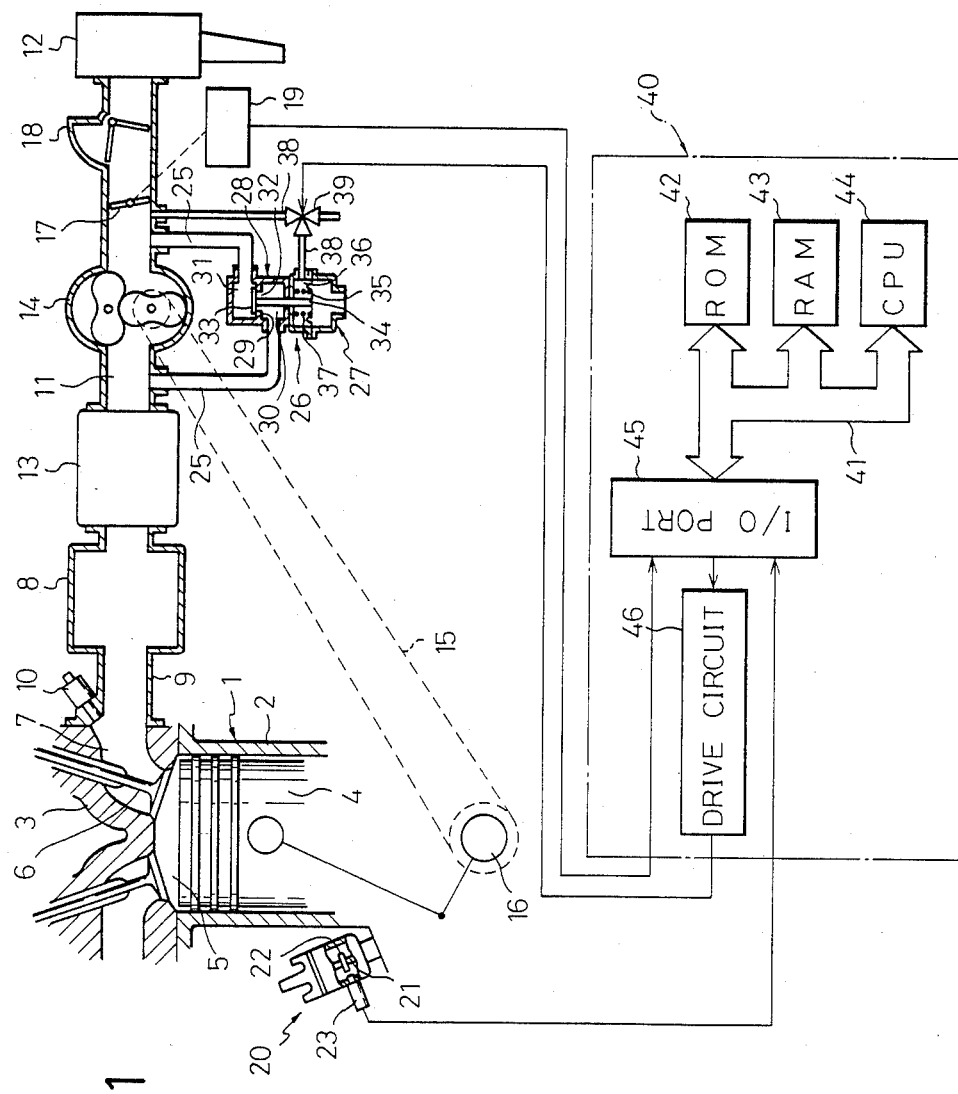
FIG. 1 is a schematically illustrated view of an embodiment of an engine according to the present invention.

Referring to FIG. 1, reference numeral 1 designates an engine body, 2 a cylinder block, 3 a cylinder head, and 4 a piston; 5 designates a combustion chamber, 6 an intake valve, 7 an intake port, and 8 a surge tank. The intake port 7 is connected to the surge tank 8 via a branch pipe 9, and a fuel injector 10 is mounted on the branch pipe 9. The surge tank 8 is connected to an air cleaner 12 via an intake passage 11, and an intercooler 13 for cooling air is arranged in the intake passage 11. A mechanically driven charger 14 is arranged in the intake passage 11 upstream of the intercooler 13. This mechanically driven charger 14 is driven by the crankshaft 16 of the engine via, for example, a belt 15. In the embodiment illustrated in FIG. 1, the mechanically driven charger 14 is a Roots pump, but any other type of pump may be used. As mentioned above, since the mechanically driven charger 14 is driven by the crankshaft 16, the discharge pressure of the mechanically driven charger 14 is increased as the engine speed is increased. A throttle valve 17 is arranged in the intake passage 11 upstream of the mechanically driven charger 14, and an air flow meter 18 is arranged in the intake passage 11 upstream of the throttle valve 17. A load sensor 19 for detecting the opening degree of the throttle valve 17 is attached to the throttle valve 17 and connected to an electronic control unit 40. A distributor 20 is mounted on the engine body 1, and a disc 22 having a toothed outer circumferential face is mounted on a rotary shaft 21 of the distributor 20. A crank angle sensor 23 is arranged to face the toothed outer circumferential face of the disc 22. This crank angle sensor 23 is connected to the electronic control unit 40.

The electronic control unit 40 is constructed as a digital computer and comprises a ROM (read only memory) 42, a RAM (random access memory) 43, a CPU (microprocessor, etc.) 44, and an I/0 port (input/output port) 45. The ROM 42, the RAM 43, the CPU 44, and the I/0 port 45 are interconnected by a bidirectional bus 41. The load sensor 19 and the crank angle sensor 23 are connected to the I/0 port 45. The load sensor 19 is a throttle switch which is made ON when the opening degree of the throttle valve 17 exceeds a predetermined opening degree, that is, when the engine load exceeds a predetermined load. Consequently, it is possible to determine whether the engine load exceeds a predetermined load on the basis of the output signal of the load sensor 19. However, in place of the load sensor 19, a load sensor constructed by a vacuum sensor which detects the level of vacuum in the intake passage 11 between the throttle valve 17 and the mechanically driven charger 14 may be used. The crank angle sensor 23 produces an output pulse each time the crankshaft 16 rotates by a predetermined crank angle, and thus it is possible to calculate the engine speed on the basis of the output pulses of the crank angle sensor 23. This calculation of the engine speed is carried out in the CPU 44.

As illustrated in FIG. 1, a bypass passage 25 is branched from the intake passage 11 between the throttle valve 17 and the mechanically driven charger 14 and connected to the intake passage 11 between the intercooler 13 and the mechanically driven charger 14. A relief valve 26 is arranged in the bypass passage 25. This relief valve 26 comprises a diaphragm apparatus 27 and a valve chamber 28. The valve chamber 28 is divided into a higher pressure chamber 30 and a lower pressure chamber 31 by a separating wall 29, and a valve port 32 is formed on the separating wall 29. The higher pressure chamber 30 is connected to the intake passage 11 downstream of the mechanically driven charger 14 via the bypass passage 25, and the lower pressure chamber 31 is connected to the intake passage 11 upstream of the mechanically driven charger 14 via the bypass passage 25. A valve body 33 controlling the opening operation of the valve port 32 is arranged in the lower pressure chamber 31 and connected to a diaphragm 35 of the diaphragm apparatus 27 via a rod 34. The diaphragm apparatus 27 comprises a pressure control chamber 36 isolated from the outside air by the diaphragm 35, and a compression spring 37 biasing the diaphragm 35 is arranged in the pressure control chamber 36. The pressure control chamber 36 is connected to the intake passage 11 between the throttle valve 17 and the mechanically driven charger 14 via a conduit 38, and a solenoid valve 39, which can be open to the outside air, is arranged in the conduit 38. The solenoid valve 39 is connected to the I/0 port 45 of the electronic control unit 40 via a drive circuit 46. This solenoid valve 39 acts as a switchover apparatus for selectively connecting the pressure control chamber 36 to the intake passage 11 or the outside air. In FIG. 1, the upward force acts on the valve body 33 due to the pressure difference between the higher pressure chamber 30 and the lower pressure chamber 31, and the downward force acts on the valve body 33 due to the spring force of the compression spring 37. The downward force acting on the valve body 33 in changed in accordance with the level of vacuum in the pressure control chamber 36. When the upward force acting on the valve body 33 is greater than the downward force acting on the valve body 33 and determined by the spring force of the compression spring 37 and the level of vacuum in the pressure control chamber 36, the valve body 33 opens the valve port 32, and as a result, the pressure in the higher pressure chamber 30, that is, the charging pressure, is reduced. In this specification, the pressure in the higher pressure chamber 30, which is controlled by the relief valve 26 and used to open the valve body 33, is called a relief pressure. Consequently, when the pressure in the higher pressure chamber 30, that is, the charging pressure, exceeds the relief pressure, the valve body 33 opens the valve port 32, and as a result, the charging pressure is reduced to that of the relief pressure. Consequently, the maximum charging pressure becomes equal to the relief pressure.

Figure 2A:
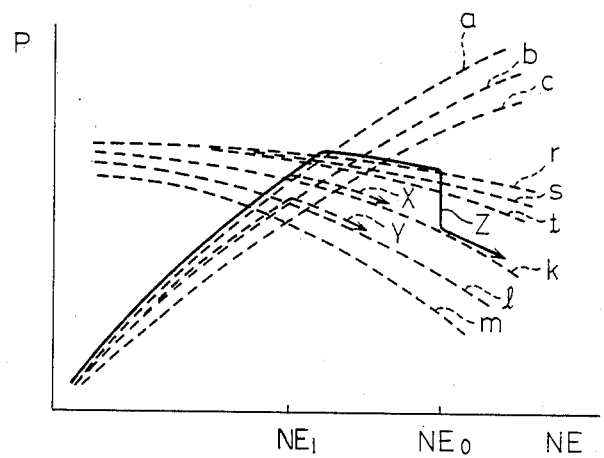
FIGS. 2A and 2B are diagrams illustrating the charging pressure and the relief pressure.

The relationship between the charging pressure and the relief pressure will be hereinafter described with reference to FIG. 2a. In FIG. 2a, the ordinate P indicates pressure, and the abscissa NE indicates engine speed. In addition, in FIG. 2a, the broken lines a, b, c indicate the discharge pressure of the mechanically driven charger 14, that is, the charging pressure, where the bypass passage 25 is not provided. The broken line a indicates the case where the engine is operating under a heavy load, and the broken line b indicates the case where the engine is operating under a middle load. The broken line c indicates the case where the engine is operating under a light load. Even if the engine speed is the same, since the level of vacuum on the suction side of the mechanically driven charger 14 is increased as the engine load is reduced, the charging pressure is reduced as the engine load is reduced.

In addition, in FIG. 2a, the broken lines k, l, m indicate the relief pressure where the pressure control chamber 36 of the relief valve 26 is connected to the intake passage 11 via the conduit 38. The broken line k indicates the case where the engine is operating under a heavy load, and the broken line l indicates the case where the engine is operating under a middle load. The broken line m indicates the case where the engine is operating under a light load. Even if the engine load is the same, since the level of vacuum in both the pressure control chamber 36 and the lower pressure chamber 31 is increased as the engine speed NE is increased, the relief pressure is gradually reduced as the engine speed NE is increased. In addition, even if the engine speed NE is the same, since the level of vacuum in both the pressure control chamber 36 and the lower pressure chamber 31 is increased as the engine load is reduced, the relief pressure is reduced as the engine load is reduced. As mentioned previously, if the charging pressure is greater than the relief pressure, the charging pressure is controlled to a pressure equal to that of the relief pressure. Consequently, when the engine speed NE is increased when the pressure control chamber 36 is connected to the intake passage 11, if the engine is operating under a heavy load, the actual charging pressure is changed at a first intermediate engine speed $NE_1$ as illustrated by the broken line X in FIG. 2a. At this time, if the engine is operating under a middle load, the actual charging pressure is changed as illustrated by the broken line Y in FIG. 2a.

In FIG. 2a, the broken lines r, s, t indicate the relief pressure where the pressure control chamber 36 of the relief valve 26 is open to the outside air. The broken line r indicates the case where the engine is operating under a heavy load, and the broken line s indicates the case where the engine is operating under a middle load. The broken line t indicates the case where the engine is operating under a light load. Where the pressure control chamber 36 is open to the outside air, the force urging the valve body 33 toward the closed position is increased, compared with the case where vacuum acts on the pressure control chamber 36. Consequently, where the pressure control chamber 36 is open to the outside air, the relief pressure r, s, t is increased as a whole, compared with the relief pressure k, l, m obtained where vacuum acts on the pressure control chamber 36. In addition, where the pressure control chamber 36 is open to the outside air, if the engine speed NE is increased, the level of vacuum in the lower pressure chamber 31 is increased, and if the engine load is reduced, the level of vacuum in the lower pressure chamber 31 is increased. Consequently, in this case, the relief pressure is changed as illustrated by the broken lines r, s, t in FIG. 2a.

Figure 3:
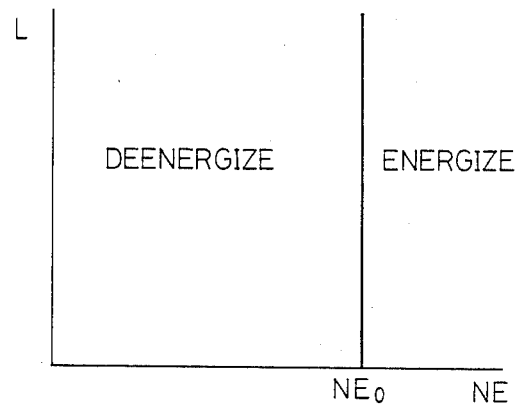
FIG. 3 is a diagram illustrating the operation of the solenoid valve.
Figure 4:
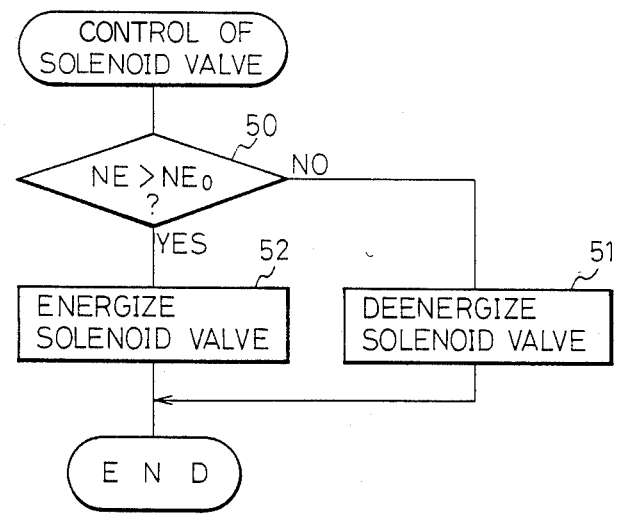
FIG. 4 is a flow chart showing the execution of the operation of the solenoid valve illustrated in FIG. 3.

FIGS. 3 and 4 illustrate the operation of the solenoid valve 39. In a first embodiment illustrated in FIG. 3, when the engine speed NE is lower than a predetermined relatively high speed $NE_0$, the solenoid valve 39 is deenergized irrespective of the engine load L and, at this time, the pressure control chamber 36 of the valve 26 is open to the outside air. When the engine speed NE is higher than $NE_0$, the solenoid valve 39 is energized and, at this time, the pressure control chamber 36 of the relief valve 26 is connected to the intake passage 11. FIG. 4 illustrates a flow chart of the execution of the operation of the first embodiment. Referring to FIG. 4, in step 50, it is determined whether the engine speed NE is higher than $NE_0$. If $NE \leq NE_0$, the routine goes to step 51, and the solenoid valve 39 is deenergized. If $NE > NE_0$, the routine goes to step 52, and the solenoid valve 39 is energized.

Figure 5:
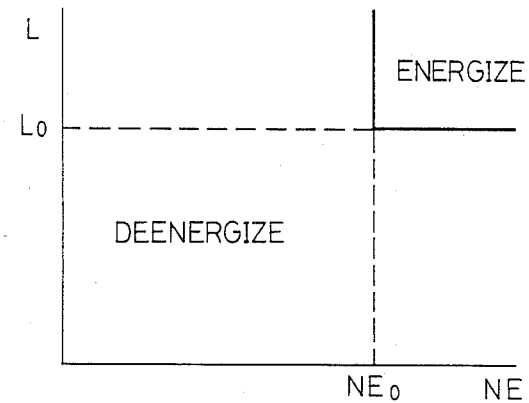
FIG. 5 is a diagram illustrating another operation of the solenoid valve.
Figure 6:
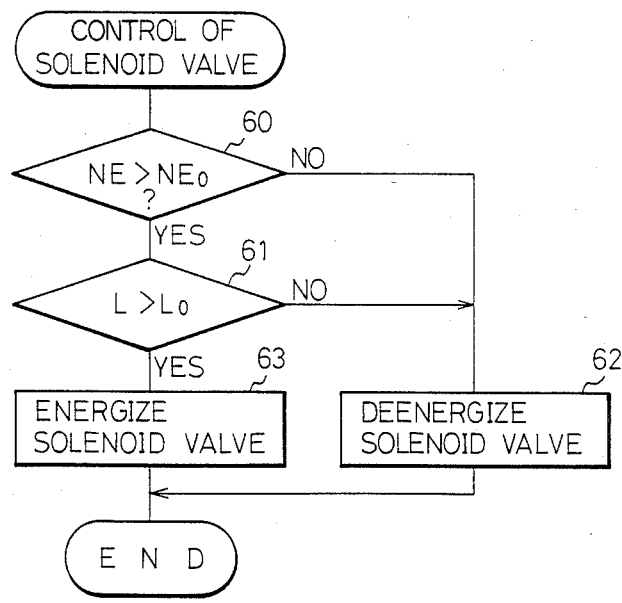
FIG. 6 is a flow chart showing the execution of the operation of the solenoid valve illustrated in FIG. 5.

FIGS. 5 and 6 illustrate a second embodiment of the operation of the solenoid valve 39. In this second embodiment, as illustrated in FIG. 5, when the engine speed NE is lower than a predetermined relatively high speed $NE_0$, or when the engine load L is lower than a predetermined relatively high load $L_0$, the solenoid valve 39 is deenergized and, at this time, the pressure control chamber 36 of the relief valve 26 is open to the outside air. When the engine speed NE is higher than $NE_0$, and when the engine load L is higher than $L_0$, the solenoid valve 39 is energized and, at this time, the pressure control chamber 36 of the relief valve 26 is connected to the intake passage 11.

FIG. 6 illustrates a flow chart of the execution of the operation of the second embodiment. Referring to FIG. 6, in step 60, it is determined whether the engine speed NE is higher than $NE_0$. If $NE > NE_0$, the routine goes to step 61, and it is determined whether the engine load L is higher than $L_0$. If $NE \leq NE_0$, or if $L \leq L_0$, the routine goes to step 62, and the solenoid valve 39 is deenergized. If $NE > NE_0$, and if $L > L_0$, the routine goes to step 63, and the solenoid valve 39 is energized.

When the engine is started, and the mechanically driven charger 14 is operated, the pressure of air in the intake passage 11 is increased by the mechanically driven charger 14, and air under pressure is fed into the combustion chamber 5. When an accelerating operation is carried out, and thus the engine speed NE is increased in a high load operating state, since the pressure control chamber 36 of the relief valve 26 is continuously open to the outside air during the time that the engine speed NE is lower than $NE_0$, the charging pressure is initially increased along the broken line a in FIG. 2a up to the intermediate speed $NE_1$, which is less than $NE_0$. When the engine speed exceeds $NE_1$, the relief valve is capable of opening as illustrated by the solid line Z in FIG. 2a. After the charging pressure becomes the same as the relief pressure, illustrated by the broken line r in FIG. 2a, the relief valve opens and the charging pressure is changed together with the relief pressure r. Then, the engine speed NE is further increased and, when NE is greater than $NE_0$, the solenoid valve 39 is energized, and thus the pressure control chamber 36 of the relief valve 26 is connected to the intake passage 11. As a result, the charging pressure is decreased to the relief pressure illustrated by the broken line k, and thereafter, the charging pressure is changed together with the relief pressure k.

In the first embodiment illustrated in FIGS. 3 and 4, if the engine speed NE is greater than $NE_0$ in a middle load operating state, the charging pressure is decreased to the relief pressure l. However, in the second embodiment illustrated in FIGS. 5 and 6, even if the engine speed NE is greater than $NE_0$ in a middle load operating state, the charging pressure is changed together with the relief pressure s since the load L is less than $L_0$.

As can be seen from the solid line Z in FIG. 2a, the charging pressure produced when the engine is operating at a middle speed is high, compared with the case where the pressure control chamber 36 of the relief valve 26 is connected to the intake passage 11 (at this time, the charging pressure becomes equal to the relief pressure k, l, m). As a result, it is possible to obtain a good accelerating operation.

Figure 2B:
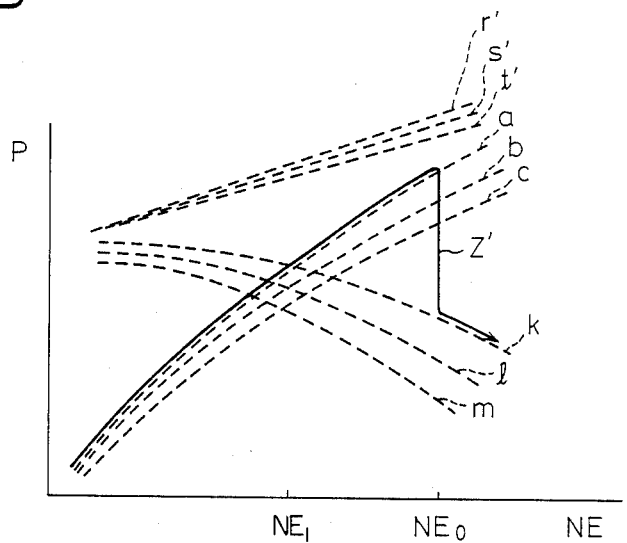
Figure 7:
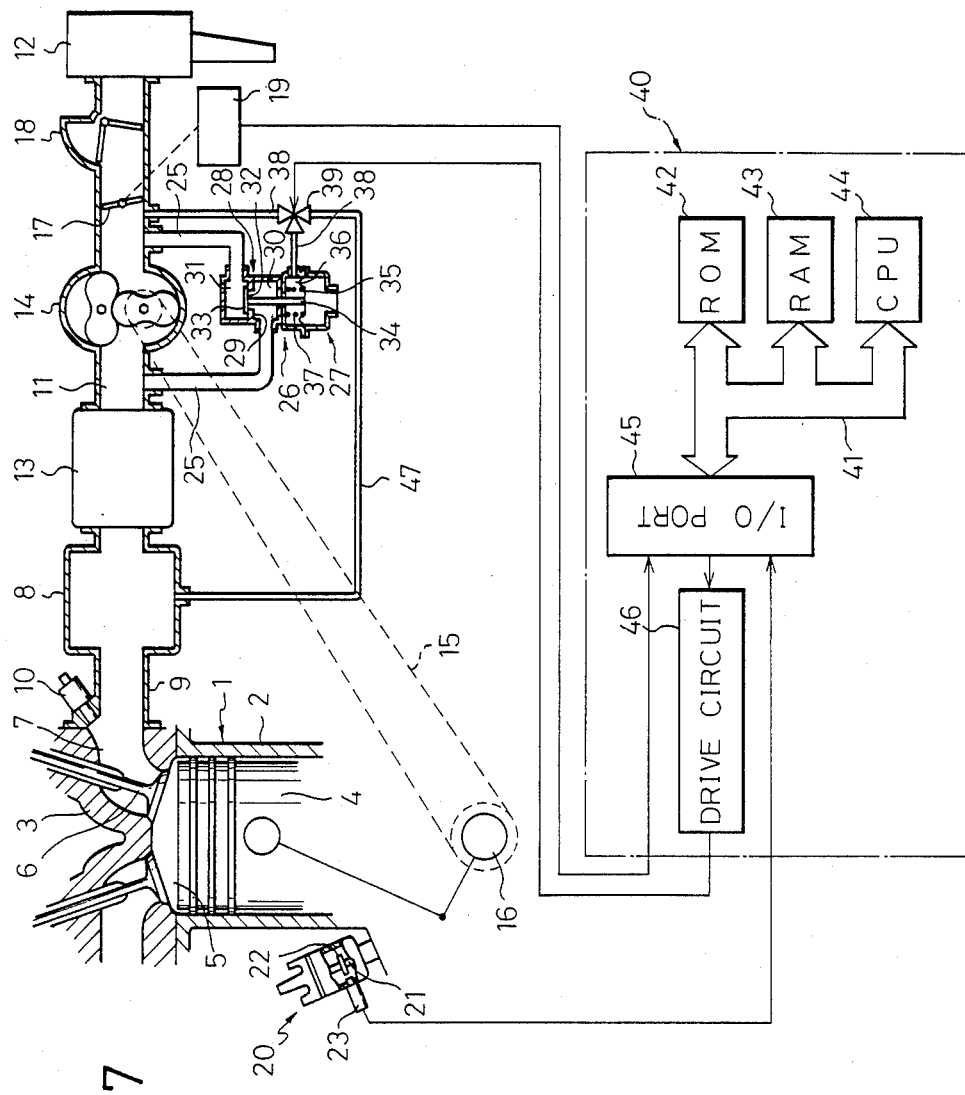
FIG. 7 is a schematically illustrated view of an alternative embodiment of an engine according to the present invention.

FIG. 7 illustrates an alternative embodiment. In this embodiment, the solenoid valve 39 is not open to the outside air but is connected with the surge tank 8 via a conduit 47. The broken lines r', s', t' in FIG. 2b illustrate the relief pressure where the pressure control chamber 36 of the relief valve 26 is connected to the surge tank 8. In this case, since the charging pressure is produced in the surge tank 8, the force of urging the valve body 33 toward the closed direction is increased as the engine speed NE is increased. In this embodiment, as illustrated in FIG. 2b, the relief pressure r', s', t' is determined to be a pressure higher than the charging pressure a, b, c.

Also in the embodiment illustrated in FIG. 7, the solenoid valve 39 is deenergized when the engine speed NE is lower than $NE_0$ as illustrated in FIG. 3, or the solenoid valve 39 is deenergized when the engine speed NE is lower than $NE_0$ or when the engine load L is lower than $L_0$ as illustrated in FIG. 5. When the solenoid valve 39 is deenergized, the pressure control chamber 36 of the relief valve 26 is connected to the surge tank 8, and thus the charging pressure acts on the pressure control chamber 36. Conversely, the solenoid valve 39 is energized when the engine speed NE is higher than $NE_0$ as illustrated in FIG. 3, or the solenoid valve 39 is energized when the engine speed NE is higher than $NE_0$ and when the engine load L is higher than $L_0$ as illustrated in FIG. 5. When the solenoid valve 39 is energized, the pressure control chamber 36 of the relief valve 26 is connected to the intake passage 11 via the conduit 38. Consequently, in the embodiment illustrated in FIG. 7, when an accelerating operation is carried out, and thus the engine speed NE is increased toward and beyond the middle speed $NE_1$ in a high load operating state, since the pressure control chamber 36 of the relief valve 26 is continuously connected to the surge tank 8 while the engine speed NE is lower than $NE_0$, the charging pressure is initially increased along the broken line a in FIG. 2b as illustrated by the solid line Z' in FIG. 2b. Then, when the engine speed NE is greater than $NE_0$, the pressure control chamber 36 of the relief valve 26 is connected to the intake passage 11, and as a result, the charging pressure is decreased to the relief pressure illustrated by the broken line k. As will be understood by comparing FIG. 2a with FIG. 2b, the charging pressure in a middle speed operating state $Ne_1 < Ne < Ne_0$) in the embodiment illustrated in FIG. 7 becomes higher than that in the embodiment illustrated in FIG. 1.

According to the present invention, it is possible to increase the charging pressure when the engine is operating at a middle speed while improving the durability of the engine by suppressing the charging pressure when the engine is operating at a high speed. As a result, it is possible to obtain a good accelerating operation of the engine.

While the invention has been described by reference to specific embodiments chosen for purposes of illustration, it should be apparent that numerous modifications could be made thereto by those skilled in the art without departing from the basic concept and scope of the invention.

We claim:

1. A device for controlling charging pressure of an internal combustion engine having an intake passage, said device comprising:
   a throttle valve arranged in the intake passage;
   a mechanically driven charger driven by the engine and arranged in the intake passage downstream of said throttle valve;
   a bypass passage branched from the intake passage between said throttle valve and said mechanically driven charger and connected to the intake passage downstream of said mechanically driven charger;
   a pressure source having a pressure which is not less than atmospheric pressure;
   speed detecting means for producing an output signal indicating an engine speed;
   relief valve means arranged in said bypass passage and having a pressure control chamber selectively communicating under the control of a control means with one of said pressure source and the intake passage between said throttle valve and said mechanically driven charger, said relief valve means opening and closing in response to charging pressure and controlling a maximum charging pressure in the intake passage downstream of said mechanically driven charger by controlling a flow area of said bypass passage in response to an absolute pressure in said pressure control chamber to reduce said maximum charging pressure as said absolute pressure is reduced, said relief valve means being opened when the charging pressure exceeds a pressure which is determined in response to the absolute pressure in the pressure control chamber thereby controlling the flow area of the relief valve means to equalize the charging pressure with the charging pressure determined by the absolute pressure in the pressure control chamber, said relief valve means having a construction such that, if the pressure control chamber is connected to the intake passage between the throttle valve and the mechanically driven charger, the relief valve is closed when the engine speed is lower than a first speed and opened when the engine speed exceeds the first speed to control the flow area of the relief valve means so that the charging pressure becomes equal to the charging pressure determined by the level of vacuum in said pressure control chamber; and said control means selectively connecting said pressure control chamber to said pressure source or the intake passage between said throttle valve and said mechanically driven charger in response to the output signal of said speed detecting means to connect said pressure control chamber to said pressure source when the engine speed is lower than a second predetermined speed that is higher than the first speed and to connect said pressure control chamber to the intake passage between said throttle valve and said mechanically driven charger when the engine speed is higher than said second predetermined speed.

2. A device according to claim 1, wherein said relief valve means comprises a valve apparatus having a valve body which controls the flow area of said bypass passage, and a diaphragm apparatus having a diaphragm which is connected to said valve body and defines said pressure control chamber.

3. A device according to claim 2, wherein said valve apparatus comprises a lower pressure chamber connected to the intake passage between said throttle valve and said mechanically driven charger, and a higher pressure chamber connected to the intake passage downstream of said mechanically driven charger, said valve body being arranged between said lower pressure chamber and said higher pressure chamber and controlling the fluid connection between said lower pressure chamber and said higher pressure chamber, said diaphragm apparatus comprising a spring which urges said valve body toward a closed position thereof.

4. A device according to claim 1, wherein said pressure source is outside air.

5. A device according to claim 1, wherein said pressure source is the intake passage downstream of said mechanically driven charger.

6. A device according to claim 1, further comprising load detecting means for producing an output signal indicating an engine load, said control means selectively connecting said pressure control chamber to said pressure source or the intake passage between said throttle valve and said mechanically driven charger in response to the output signals of said speed detecting means and said load detecting means to connect said pressure control chamber to said pressure source when the engine speed is lower than a predetermined speed or when the engine load is lower than a predetermined load and to connect said pressure control chamber to the intake passage between said throttle valve and said mechanically driven charger when the engine speed is higher than said predetermined speed and when the engine load is higher than said predetermined load.

7. A device according to claim 6, wherein said load detecting means is a load sensor producing the output signal in response to a change in the opening degree of said throttle valve.

8. A device according to claim 1, wherein said control means comprises a solenoid valve continuously connected to said pressure control chamber and selectively connected to said pressure source or the intake passage between said throttle valve and said mechanically driven charger.

* * * * *